(12) United States Patent
Somani et al.

(10) Patent No.: US 10,374,429 B2
(45) Date of Patent: Aug. 6, 2019

(54) ISLANDING A PLURALITY OF GRID TIED POWER CONVERTERS

(71) Applicant: DYNAPOWER COMPANY LLC, South Burlington, VT (US)

(72) Inventors: Apurva Somani, South Burlington, VT (US); John C. Palombini, South Burlington, VT (US)

(73) Assignee: DYNAPOWER COMPANY LLC, South Burlington, VT (US)

( * ) Notice: Subject to any disclaimer, the term of this patent is extended or adjusted under 35 U.S.C. 154(b) by 0 days.

(21) Appl. No.: 15/790,549

(22) Filed: Oct. 23, 2017

(65) Prior Publication Data

US 2018/0048158 A1 Feb. 15, 2018

Related U.S. Application Data

(63) Continuation of application No. 15/196,869, filed on Jun. 29, 2016, now Pat. No. 9,819,190.

(Continued)

(51) Int. Cl.
*H02J 3/38* (2006.01)

(52) U.S. Cl.
CPC .......... *H02J 3/381* (2013.01); *H02J 2003/388* (2013.01); *Y02P 80/14* (2015.11); *Y02P 80/152* (2015.11)

(58) Field of Classification Search
CPC .......... H02J 3/83; H02J 2003/388; H02J 3/42; H02J 3/48; H02J 3/40; Y02P 80/14; Y02P 80/152

See application file for complete search history.

(56) References Cited

U.S. PATENT DOCUMENTS

2005/0105306 A1   5/2005   Deng et al.
2011/0115310 A1   5/2011   Dong et al.
(Continued)

OTHER PUBLICATIONS

MD Nayeen Arafat, et al; "An Effecttive Smooth Transition Control Strategy using Droop Based synchronization for Parellel Inverters", Published in: Energy Conversion Congress and Exposition (ECCE), 2014 IEEE, Date of Conference: Sep. 14-18, 2014; pp. 2443-2454.

(Continued)

*Primary Examiner* — Rexford N Barnie
*Assistant Examiner* — Terrence R Willoughby
(74) *Attorney, Agent, or Firm* — Ladas & Parry LLP (57) ABSTRACT

A power system having a plurality of power converters coupled together at a point of common coupling (PCC). The power converters are coupled to a load and provide a combined power converter output to the load. A switch is coupled in series between the PCC and an external grid. When the switch is closed, the power system is in a grid-tied configuration and when the switch is open, the power system is in a microgrid configuration. A control system coupled to the power converters enables the switch to open and close in response to a signal received from one or more sensors monitoring the external grid, enables the power converters to operate in a current control mode when the switch is closed, and transitions the power converters from grid-tied mode to microgrid mode and synchronize the power converters such that the converters share the load.

25 Claims, 6 Drawing Sheets

Related U.S. Application Data

(60) Provisional application No. 62/188,278, filed on Jul. 2, 2015.

(56) References Cited

U.S. PATENT DOCUMENTS

| | | | |
|---|---|---|---|
| 2011/0144822 A1* | 6/2011 | Choi | H02J 3/32 700/297 |
| 2013/0181531 A1 | 7/2013 | Deboy et al. | |
| 2015/0028851 A1* | 1/2015 | Ohori | G01R 19/2513 324/76.82 |
| 2016/0181809 A1 | 6/2016 | Chiang et al. | |

OTHER PUBLICATIONS

Alfred Engler: "Control of parallel operating battery inverters", Available from: Alfred Engler, Retrieved on Aug. 30, 2016, 3 pages.
Wang Cheng Shan et al; A Seamless Operation Mode Transition Control Strategy for a Microgrid based on Master-Slave Control:, Proceedings of the 31st Chinese Control Conference, Jul. 25-27, 2012; Hefei, China, 4 pages.
International Search Report and Written Opinion dated Sep. 9, 2016; PCT/US2016/039963.
USPTO RR dated Nov. 18, 2016 in connection with U.S. Appl. No. 15/196,869.
USPTO NFOA dated Apr. 10, 2017 in connection with U.S. Appl. No. 15/196,869.
USPTO NOA dated Jul. 17, 2017 in connection with U.S. Appl. No. 15/196,869.

* cited by examiner

ISLANDING A PLURALITY OF GRID TIED POWER CONVERTERS

RELATED APPLICATIONS

The present patent document claims the benefit of the filing date under 35 U.S.C. § 119(e) of Provisional U.S. patent application Ser. No. 62/188,278, filed Jul. 2, 2015, which is hereby incorporated by reference.

FIELD OF THE INVENTION

The present invention relates generally to power converters; and more specifically, to systems and methods for islanding a plurality of grid-tied power converters to form a microgrid.

BACKGROUND OF THE INVENTION

A power system may include distributed power sources (e.g., distributed generators, battery banks, and/or renewable resources such as solar panels or wind turbines to provide power supply to a grid (e.g., a microgrid having local loads and/or a utility grid). The power system may include a power converter, such as a power inverter, for converting power between a power source and a grid. Such power conversion may include AC/DC, DC/DC, AC/AC and DC/AC.

A microgrid system can include a variety of interconnected distributed energy resources (e.g., power generators and energy storage units) and loads. The microgrid system may be coupled to the main utility grid through switches such as circuit breakers, semiconductor switches (such as thyristors and IGBTs) and/or contactors. In the event that the microgrid system is connected to the main utility grid, the main utility grid may supply power to the local loads of the microgrid system. The main utility grid itself may power the local loads, or the main utility grid may be used in combination with the power sources of the microgrid to power the local loads.

A controller comprising hardware and software systems may be employed to control and manage the microgrid system. Furthermore, the controller may be able to control the on and off state of the switches so that the microgrid system can be connected to or disconnected from the main grid accordingly. The grid connected operation of the microgrid system is commonly referred to as "grid tied" mode, whereas the grid disconnected operation is commonly referred to as "islanded" or "stand alone" mode. A microgrid system in grid-tied mode should be capable of being disconnected from the main grid and transitioning to islanded mode in the case of a grid event in which abnormal operation conditions, such as a power outage, occur at the main utility grid.

When the microgrid includes a battery bank, a battery energy storage system may be used to provide power to, or to receive power from, the microgrid. The battery energy storage system can be used as an energy storage unit in a smart grid system. Renewable energy sources such as photovoltaic/solar panels and wind turbines are intermittent sources subject to unpredictable and inconvenient weather patterns. The generation source rarely matches the load needs; and therefore, it is desirable to provide energy storage units. The use of energy storage units, which can both store and supply power, allows the microgrid system to provide reliable and stable power to local loads.

The energy storage units can also store excess energy from the renewable sources (and potentially the grid). For example, renewable energy generation may exceed load demand of the microgrid. Without energy storage capability, the extra generation is lost. If energy storage units are employed in the microgrid, the extra generation can be captured by storing it in the batteries. The energy storage units can then supply this power to local loads and even the main utility grid where appropriate.

Unfortunately, existing implementation do not enable multiple units to be seamlessly transitioned between grid-tied and stand-alone mode.

BRIEF SUMMARY OF THE INVENTION

In accordance with the present disclosure, a combination of renewable energy sources and energy storage units may be used to form self-sustaining microgrids. Such self-sustaining microgrids may be used for critical loads that cannot afford downtime and in remote areas.

Embodiments of the present invention include a plurality of power converters coupled together and configured to provide a combined power converter output to the load.

In one aspect, a power system having a plurality of power converters may be coupled together at a point of common coupling (PCC). The power converters may be configured to be coupled to a load at the PCC and provide a combined power converter output to the load. A switch may be coupled to the PCC and configured to be coupled in series between the PCC and an external grid in such a way that when the switch is closed, the power system is in a grid-tied configuration, and when the switch is open, the power system is in a microgrid configuration. A control system, comprising one or more controllers coupled to the plurality of power converters, may be configured to enable the switch to open and close in response to a signal received from one or more sensors monitoring the external grid, enable the power converters to operate in a current control mode when the switch is off and when the system is in the grid-tied configuration, transition the plurality of power converters from grid-tied mode to microgrid mode, and synchronize the power converters such that the converters share the load.

The PCC may be a shared AC bus.

The power system may further comprise a proximate sensor coupled between the PCC and the switch and a distal sensor coupled between the switch and the external grid. The control system may enable the distal switch to open and close in response to signals received from the proximate and distal sensors.

The control system may be further configured to receive a distal sensor signal to measure an external grid input and enable the switch to open when the control system determines that the external grid input is in an abnormal state.

The control system may be configured to receive a proximate sensor signal to measure a combined power converter output. The control system may further be configured to enable the switch to close when the system determines that the external grid input is in a normal state and when the combined power converter output substantially matches the external grid input.

After enabling the switch to close, the control system may be further configured to synchronize the power converters to the external grid voltage. With the synchronization of the converters to the grid, the control system may simultaneously change the frequency of each of the power converters to remain synchronous with each other.

The power system in which the external grid may be in the abnormal state when at least one of the voltage amplitude or frequency is outside the lower or upper bounds.

The power system in which the control system is further configured to transition the plurality of power converters from grid-tied mode to microgrid mode and synchronize the power converters in such a way that the converters share the load. This synchronization may include the control system being configured to transition one or more of the plurality of converters from the current control mode to a voltage control mode, in such a way that one or more of the converters establishes the voltage of the microgrid.

The power system in which the control system being configured to transition the plurality of power converters from grid-tied mode to microgrid mode and synchronize the power converters such that the power converters share the load includes the control system being configured to record the grid phase angle prior to transitioning to microgrid mode and set the microgrid phase angle according to the recorded grid phase angle.

The power system in which the control system is further configured to transition the plurality of power converters from grid-tied mode to microgrid mode and synchronize the converters in such a way that the converters share the load, may also include the control system being configured to implement droop control on each of the plurality of power converters.

The power system in which the control system being configured to implement droop control on each of the plurality of power converters may also include the control system being configured to, for each power converter, apply voltage and frequency droop to their respective set points in accordance with $$U\_set = U\_nom - KQV * Qout$$

wherein U_set corresponds to a voltage setpoint amplitude,
U_nom corresponds to a nominal voltage amplitude,
KQV corresponds to a droop voltage slope (V/kVAR), and
Qout corresponds to a measured output reactive power, and $$F\_set = F\_nom - KPF * Pout$$

wherein F_set corresponds to a frequency setpoint of the CI output,
F_nom corresponds to a nominal frequency,
KPF corresponds to a droop frequency slope (Hz/kW), and
Pout corresponds to a measured output active power.

The power system in which the control system may further comprise a plurality of controllers, each controlling one of the converters that implement droop control on their respective converter.

The power system in which the control system further comprises a plurality of controllers each controlling one of the plurality of converters, wherein one of the plurality of controllers may be a master controller and the remaining controllers may be slave controllers. The control system that is configured to transition the plurality of converters from grid-tied mode to microgrid mode and synchronize the converters so that the converters share the load may also have a master controller being configured to: enable its power converter to operate in voltage control mode by controlling the voltage amplitude and frequency; and generate active and reactive current commands for the slave controllers to follow. One or more of the slave controllers may be configured to receive the active and reactive current commands from the master controller and enable their power converters to operate in current control mode.

The power system in which the control system comprises a plurality of slave controllers, each one controlling one of the power converters, and a master controller coordinating the slave controllers being configured to transition the converters from grid-tied mode to microgrid mode and synchronize the converters so that the converters share the load, may also include a master controller being configured to operate in voltage control mode by controlling the microgrid voltage, amplitude, and frequency, and generate active and reactive current commands for the slave controllers to follow. Within this command, the slave controllers may also be configured to receive the active and reactive current commands from the master controller and enable their power converters to operate in current control mode. During this, the output of the converter coupled to one or more of the slave controllers may be controlled using the active and reactive commands from the master controller.

The power system may further comprise a plurality of power resources coupled to the inverters.

The power system in which the power sources may be selected from the group consisting of battery power resources, photovoltaic power resources, fuel cell power resources, compressed air storage power resources, capacitor power resources, wind turbine power resources, microturbine power resources, hydro power resources, wave power resources, thermal power resources, flywheel power resources, and biomass power resources.

The power system in which the plurality of resources includes a battery power resource and a renewable power resource. The control system may be further configured to compare the storage of the battery power resource to a highlimit threshold, and if it exceeds the highlimit threshold, command the renewable power resource to curtail power generation.

The power system may further comprise one or more DC/DC converters, each serially coupled between one of the power resources and one of the power converters.

The power system in which the switch may be a contactor, a motorized switch, or a semiconductor AC switch.

The power system that during an islanded microgrid configuration, the power converters equally contribute to the combined output to the load.

The power system that during an islanding microgrid configuration, the power converters do not equally contribute to the combined output of the load.

In another aspect, a method of transitioning a plurality of power converters coupled together at a PCC from a grid-tied mode to a microgrid mode, includes: opening an island switch, coupled in series between the PCC and an external grid; setting the microgrid voltage and frequency commands of the converters to the last known grid voltage and frequency; ramping the microgrid voltage and frequency commands of the converters from the last known grid voltage and frequency to a nominal voltage and frequency; applying a voltage droop to the microgrid voltage command of the converters to facilitate sharing of reactive power; and applying frequency droop to the frequency commands of the converters to facilitate sharing of active power.

The method may further comprise setting the initial microgrid phase angle according to the last known grid phase angle.

The method may further comprise monitoring an external grid voltage, amplitude, and frequency to determine whether the islanding switch should be opened if one or more of the external grid voltage, amplitude, or frequency fall outside of the upper or lower bounds.

The method in which the power converters are coupled to a battery power resource and a renewable power resource that may further comprise comparing a battery storage of the battery power resource to a highlimit threshold, and if the storage exceeds the threshold, commanding the renewable power resource to curtail power.

In still another aspect, a method of transitioning a plurality of power converters that are coupled together at a PCC from a grid-tied mode to a microgrid mode using a master controller and one or more slave controllers coupled to the power converters, the method may further comprise: opening an islanding switch coupled in series between the PCC and the external grid; setting, by way of master controller, the microgrid voltage and frequency commands from the last known grid voltage and frequency; ramping, by way of master controller, the microgrid voltage and frequency commands from the last known grid voltage and frequency to nominal voltage and frequency; generating, by way of master controller, active and reactive current commands for one or more slave controllers to follow; operating the one or more slave controllers in current control mode, during which, the output of a power converter coupled to a slave controller is controlled using the active and reactive current commands from the master controller.

The method may further comprise the master controller setting the initial microgrid phase angle according to the last known grid phase angle.

The method may further comprise monitoring an external grid voltage, amplitude, and frequency, and opening the islanding switch when the external grid voltage, amplitude, and frequency fall outside the upper or lower bounds.

The method in which the power converters are coupled to a battery power source and a renewable power resource, that may further comprise comparing, by way of master controller, battery storage of the battery power resource to a highlimit threshold, and commanding the renewable power resource to curtail power if the battery storage exceeds the threshold.

It should be noted that this disclosure should not be limited to the embodiments described in this disclosure. Numerous other embodiments are also possible using the concepts enclosed herein.

BRIEF DESCRIPTION OF THE FIGURES (NON-LIMITING EMBODIMENTS OF THE DISCLOSURE)

Other advantages of the present invention will be readily appreciated, as the same becomes better understood by reference to the following detailed description when considered in connection with the accompanying drawings, wherein.

DETAILED DESCRIPTION

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

In the following description of the invention, certain terminology is used for the purpose of reference only, and is not intended to be limiting. For example, although the terms first, second, etc. may be used herein to describe various elements, these elements should not be limited by these terms. These terms are only used to distinguish one element from another. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed terms. It will be further understood that the terms "comprises" and/or "comprising," when used in this specification, specify the presence of stated features, integers, steps, operations, elements, and/or components, but do not preclude the presence or addition of one or more other features, integers, steps operations, elements, components, and/or groups thereof.

Embodiments of the present invention include systems and methods for islanding a plurality of power converters to form a microgrid. Power converters (e.g., a bi-directional power inverter, DC/DC converter, AC/DC converter, etc.) are used in microgrid applications to convert power between a power source and a grid. When it is desired to switch from a grid-tied mode, in which the power converters are connected to an external grid such as a utility grid, to a microgrid mode, it is necessary to disconnect the power converters from the grid and set the voltage of the grid. Embodiments of the present invention utilize inter-unit synchronization and/or control signal communication to seamlessly transition a plurality of power converters from a grid-tied mode to an islanded mode to continue to power the critical loads of the microgrid. Communication between the various components of the power system may be accomplished over a power bus using, for example, X10 protocol.

When the power converters are connected to the external grid, the power converters may operate in current control (or source) mode under control of a control system. The control system may include the power converter's own controller as well as a site controller that coordinates the various distributed energy resources of the microgrid. The power converter's own controller may be housed within the cabinet of the power converter in an environment protected from the power electronics of the power converter, or an external environment. In a grid-tied mode, the phase of the grid voltage is defined by the grid. The power converters operate in synchronism with the grid frequency and phase.

When transitioning to microgrid mode, one or more of the power converters may transition to voltage control mode in which the power converter sets the voltage of the microgrid. The power converters may then share the load equally, both in steady state and during transients. In another embodiment, the microgrid may implement unequal load sharing based, for example, on remaining battery energy (state of charge) of individual power converters. Such unequal load sharing may be implemented by a site controller that coordinates the various distributed energy resources of the microgrid or autonomously by the distributed energy resources based on their respective available energies.

The decision on whether to disconnect from the external grid may be based on the conditions of the external grid. For example, if the external grid voltage or frequency is outside of upper and lower bounds, the control system may decide to disconnect from the external grid. Exemplary values for the voltage bounds are: Lower bound—−12%, Upper bound=+10%. Example values for the frequency bounds are: Lower bound=57 Hz, Upper bound=60.5 Hz. When the grid voltage is within bounds again, the power converters will automatically synchronize the output voltage with the grid voltage and seamlessly transition to grid-tied operation. In certain cases, disconnection from the external grid may be requested by a grid operator anticipating problems with the grid. In such cases, the microgrid may disconnect from the external grid while still powering local loads.

Figure 1A:
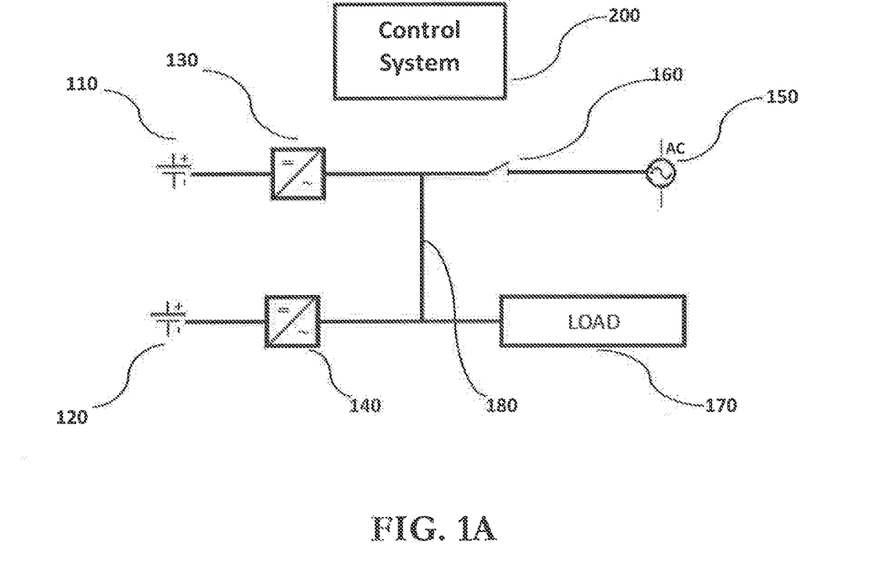
FIGS. 1A-1D are exemplary embodiments of a system for islanding multiple grid-tied energy storage inverters to form a microgrid.
Figure 1B:
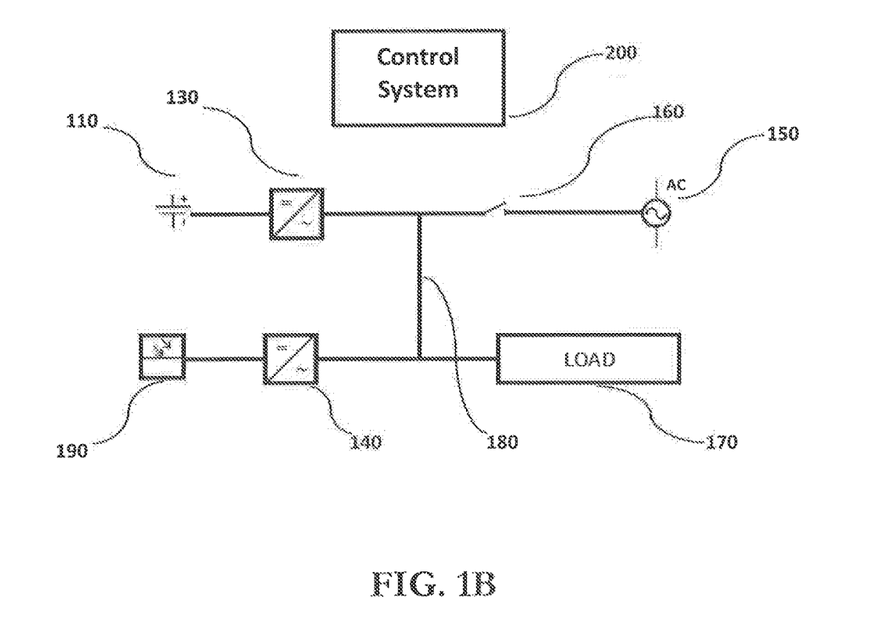
Figure 1C:
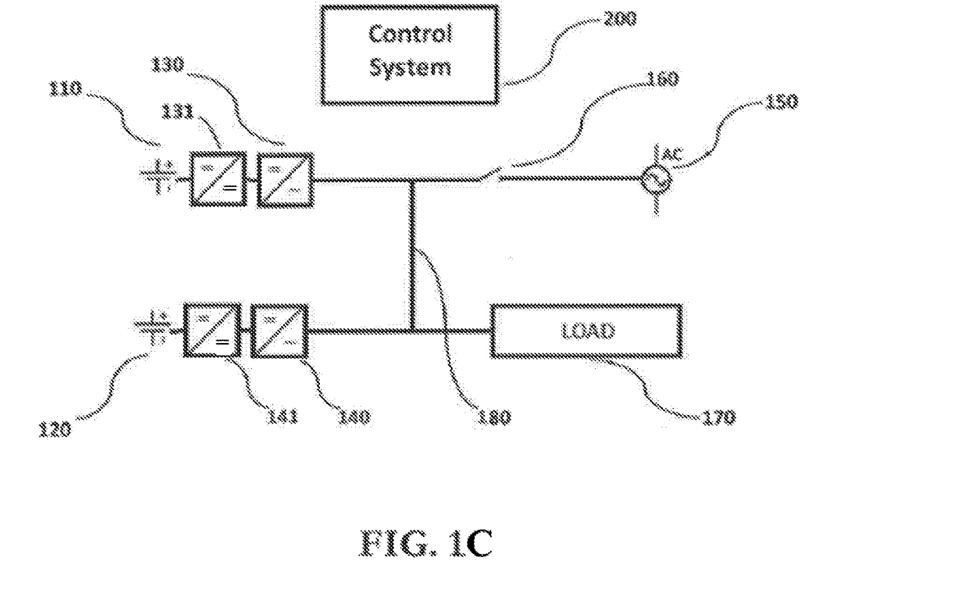
Figure 1D:
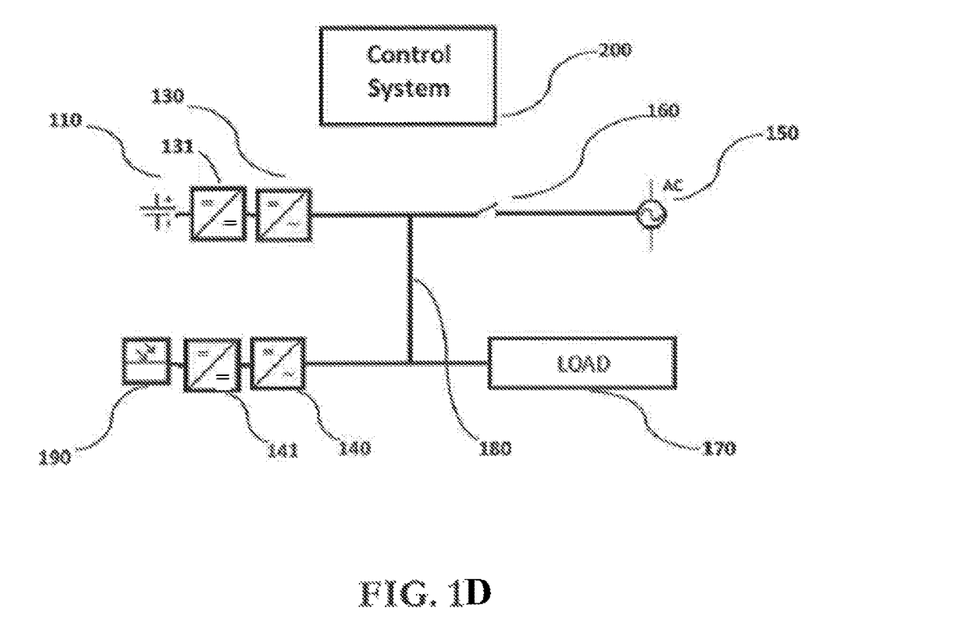

FIGS. 1A-1D are exemplary embodiments of a system for islanding multiple grid-tied power converters to form a microgrid. In the embodiments shown in FIGS. 1A and 1B, the plurality of power converters 130 and 140 are connected in parallel, and the plurality of power converters 130 and 140 are coupled to a load at a point of common coupling (PCC). FIGS. 1C and 1D show additional DC/DC converters 131 and 141, each serially coupled between one of the power resources 110 and 120/190 and one of the power converters 130 and 140, respectively.

Referring to FIG. 1A, a power system 100 according to an embodiment of the present invention may include power resources 110 and 120, power converters 130 and 140, external grid/AC source 150, disconnect/islanding switch 160, load 170, AC bus 180, and control system 200.

In the embodiment illustrated in FIG. 1A, the power resources 110 and 120 are batteries (or battery banks) and the power converters 130 and 140 are bi-directional power inverters 130 and 140. The bi-directional power converters convert between DC and AC. The battery 110 or 120 and the power inverter 130 or 140 can together be referred to as an energy storage system. Such energy storage systems can be used in numerous applications including, but not limited to, renewable firming, ramp rate control, peak shaving and frequency regulation.

External grid/source 150 may be the main utility grid, a separate grid segment of the microgrid, or another AC or DC source connected to the microgrid. Disconnect 160 may be the means by which to separate the microgrid from AC Source 150. Disconnect 160 may be an islanding switch that disconnects the external grid 150 from the microgrid. The disconnect 160 may be, for example, a static disconnect switch, a motorized breaker, contactor, semiconductor AC switch, etc.

Load 170 represents the load that is actually consuming the energy. Load 170 is represented in FIG. 1A on the AC side but may also be a DC load. In an alternative embodiment, the load 170 may not be present.

The power converters are coupled together at a point of common coupling (PCC) to share the load 170. In the embodiment illustrated in FIG. 1A, the PCC is an AC bus. AC bus 180 interfaces with local load 170 on the microgrid.

In one example of an implementation based on FIG. 1A, two energy storage inverters, 130 and 140 and batteries 110 and 120 are installed adjacent to a building load 170. The building load 170 may be powered by external grid/AC source 150. In this example, the AC source 150 is the utility grid. During normal operation, the batteries 110 and 120 may provide other value streams such as participating in an ancillary services market, providing peak reduction, providing renewables integration, etc. Upon failure of the utility 150 such as a blackout, disconnect 160 is opened by the control system 200. The control system may then transition the power system 100 to microgrid mode. In this mode one or both of inverters 130 and 140 transition from current control (or source) mode to voltage control (or source) mode to continue to supply load 170 with energy during the utility 150 outage. It should be noted that two inverters are shown in FIGS. 1A and 1B only for exemplary purposes. Any number of inverters may be used within the scope of this invention.

Once the utility 150 is restored, control system 200 directs the AC voltage of the microgrid to be synchronized with the AC voltage of the utility 150 and directs disconnect 160 to close. Once disconnect 160 is closed with respect to all inverters, inverters 130 and 140 re-synchronize to utility 150 and transition back to current control (or source) operation mode.

FIG. 1B is another exemplary embodiment of a system for transitioning multiple grid-tied power converters between grid-tied and microgrid modes. In the embodiment shown in FIG. 1B, solar array 190 replaces battery 120 as one of the power resources. In the embodiment shown in FIG. 1B, power converter 130 is a bi-directional power inverter that provides energy from or to battery 110, and power converter 140 is a power inverter that converts DC energy from solar array 190 to AC energy suitable for load 170 and/or external grid 150. Similar to the embodiment shown in FIG. 1A, the power system of FIG. 1B transitions between a grid-tied mode to a microgrid mode.

In another example, with reference to the embodiment of FIG. 1B, a battery energy storage inverter 130 may be coupled with battery 110 and installed adjacent to building load 170. A photovoltaic (PV) system comprising of inverter 140 and solar array 190 may also be installed. Solar inverter 140 may or may not be manufactured by the same supplier or even the same type as inverter 130. The PV system may be installed before, at the same time, or after installation of the energy storage system (inverter 130 and battery 110).

In one example of an implementation based on FIG. 1B, the load 170 may be powered by external grid/AC source 150 and solar power from inverter 140. Upon failure of the utility 150, such as a blackout, disconnect 160 is opened via commands from control system 200. Control system 200 may be programmed to transition the system to microgrid mode. In this mode, energy storage inverter 130 transitions from current source mode to voltage source mode to continue to supply load 170 with energy during the utility outage. By energy storage inverter 130 transitioning to voltage source mode, solar inverter 140 may stay in PV production mode and continue to supply load 170 with energy. If the solar production is greater than the power needed by the load, the additional energy may be used, for example, to charge battery 110. If the solar production is below the demand of the load 170, battery 110 may discharge to provide the additional power needed for operation. Once the utility 150 is restored, the AC voltage of the microgrid is synchronized with the AC voltage of the utility grid 150 and the disconnect 160 is closed. Once disconnect 160 is closed power converters 130 and 140 transition back to current control source operation mode.

In the embodiments illustrated in FIGS. 1A and 1B, the power converters 130 and 140 are power inverters coupled to DC power sources 110 and 120. However, it should be understood that the invention is not limited to power inverters or DC sources. For example, the power source 110 may be an AC source such as a wind turbine, and the power converter 130 or 140 may include an AC/DC converter coupled in series to an AC/DC power inverter between the wind turbine and the AC bus 180. Moreover, the microgrid equipment such as battery energy storage inverters, PV and wind systems, diesel generators, etc. may be directly coupled to the bus 180 or through isolation or autotransformers. Furthermore, some distributed assets, such as a wind turbine, may be an AC source and have an AC/AC converter where the input AC is from the turbine to the converter and the output AC connection is to the grid. Power sources 110 and 120 may be any DC source or combination of DC sources and AC sources. Examples of such other sources that may be used are generator(s), wind, PV (photovoltaic), fuel cell, compressed air storage, etc. Power converters 130 and 140 may thus be AC/DC, DC/DC, AC/AC or DC/AC.

Figure 2:
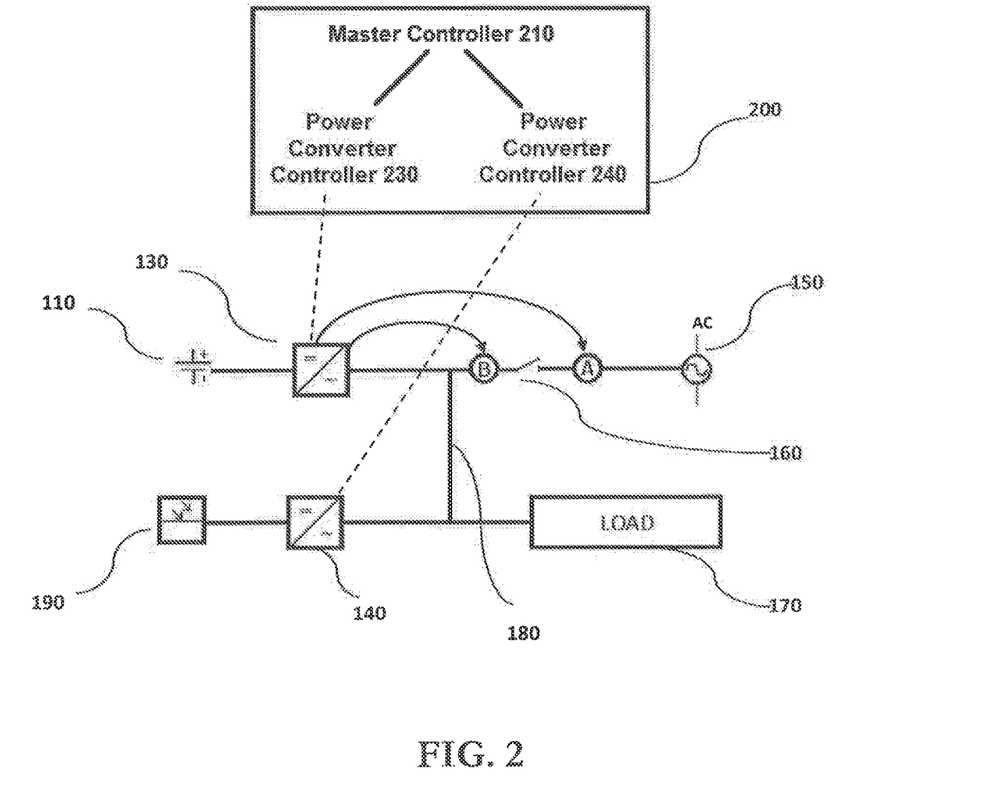
FIG. 2 illustrates an exemplary embodiment for controlling the transition and synchronization of power converters between the grid-tied and microgrid modes.

FIG. 2 illustrates an exemplary embodiment for controlling the transition and synchronization of the power converters 130 and 140 between the grid-tied and microgrid modes. Control system 200 may include a plurality of controllers. The plurality of controllers may, for example, be field-programmable gate arrays (FPGA) and/or a digital signal processing based controller capable of being updated both locally and remotely.

Control system 200 may include a plurality of controllers and sensors that communicate with each other for synchronization and transition between grid-tied and microgrid modes. The control system may include a plurality of individual power converter controllers 230 and 240 each controlling one of the power converters of the power system 100. The control system 200 may also include a master controller 210 that is configured to coordinate between individual inverter controllers 230 and 240. The master controller may be a separate site controller, may be one of the individual controllers of one of the power converters, or may be housed within one of the power inverters along with the power converter's individual controller. The controller of one of the individual power converters 230 or the master controller 210 may be configured to monitor voltages on either side of islanding switch 160, i.e. sensing point A and sensing point B using proximal (point A) and distal (point B) sensors. Commercially available transducers may be used at sensing points A and B to provide a voltage signal to the control system for monitoring the voltage on both sides of islanding switch 160.

In accordance with some embodiments, AC voltage and frequency of AC source 150 may be monitored by control system 200 at point B. The voltage and frequency may be compared to voltage and frequency boundaries. If either, or both, of the voltage and/or frequency violate the permitted range, the system may transition from grid-tied to microgrid mode. This transition may include at least one of the power converters transitioning from current control (or source) mode to voltage control (or source) mode. Alternatively, a master site controller can operate in voltage control mode to set the voltage of the microgrid, and the power converters may receive current commands from the master site controller and operate in current control mode.

When operating in a grid-tied mode, islanding switch 160 is closed and energy from energy sources 110 and 190 are coupled with the grid 150. Energy may be used from energy sources 110 and 190 to provide power to the load 170 or additional generation to the utility/grid 150 to support other loads. While islanding switch 160 is closed, the voltage at sensing points A and B should be equal in magnitude, frequency, and phase.

The connections between inverters 130 and 140 may be made from a conductive material such as copper or aluminum. Islanding switch 160 is preferably a fast acting switch such as a contactor, static switch (semiconductor based), or a motorized breaker. Power converter 130, islanding switch 160, sensor point A and sensor point B may be located close to one another but proximity is not required. In one example, they may be within 50 ft apart while in other examples they are 500 ft apart or more. For example, disconnect 160 may be located a substantial distance away in a distribution substation. In this case it may be preferred to use a fiber optic link or other high speed link between power converter 130, power converter 140, and disconnect 160. In this embodiment, the entire distribution feeder which may include loads that are not collocated with the inverter, miles of medium voltage distribution line, and step down transformers to service loads at the load site, may now be islanded from AC source 150.

If control system 200 senses the voltage or frequency of the voltage are out of bounds, the control system enables the islanding switch 160 to open. The signal from control system 200 may be sent for example, as a relay signal, a fiber optic link, or through other digital communication methods. The voltage and frequency bounds may be settable and can be set and configured based on specific needs such as the load requirements. For example, values for voltage bounds may be set as follows: Lower bound=−12%, Upper bound=+10%. Example values for frequency bounds may be: Lower bound=57 Hz, Upper bound=60.5 Hz. It should be clear to a person of ordinary skill in the art that numerous other voltage and frequency bounds are possible.

When disconnected from the grid, control system 200 transitions the plurality of power converters from grid-tied mode to microgrid mode and synchronizes the power converters such that the power converters share the load. The power converters transition together using a single disconnect 160 on the same microgrid. In this mode, the power converters may define the phase of the microgrid voltage. During the transition to microgrid mode from grid-tied mode, a snapshot of the phase angle of the grid voltage may be taken along with the last known voltage and frequency. The power converters on the microgrid may then initialize their phase calculations based on this last phase information from the grid. One benefit in preserving the phase is that this allows multiple power converters to be initialized with the same phase value, thereby allowing the transition to microgrid/islanded mode with an initially synchronized condition. Further, the load does not experience a phase jump which may help with smoother transients. A grid voltage waveform has three main attributes. The amplitude is the magnitude of the grid voltage. For example, a 480V system will have a peak amplitude of 480*1.414=678V. The frequency is the number of voltage sinewaves during a 1 s period of time. For example, if there are 60 cycles per second, the frequency is 60 Hz. The phase denotes where in the sinewave the voltage waveform is at any given point of time.

In an embodiment, to facilitate the transition and synchronization, the power system 200 saves the last known grid voltage, grid frequency, and grid phase angle. Thus, when disconnect 160 disconnects from grid 150, the control system has a snapshot of the sine wave of grid 150 at the time the plurality of power converters disconnected from grid 150. Through the control system 200, the power converters can know where the sine wave is at the point where the islanding switch is commanded by power system 200 to open, and the power converters can pick up the sine wave from that spot so the critical loads do not see much of a transient, if any, as they transition from grid-tied mode to microgrid mode.

In an embodiment, it is possible that one or more of the power converters is unaware of the change of state of disconnect 160. For example, in one case in which the microgrid includes a photovoltaic system comprising a PV inverter 140 and solar array 190 and an energy storage system comprising a storage inverter 130 and a battery 110, it may be unnecessary for the photovoltaic system to be notified of the change of state. For example, when transitioning from grid-tied to microgrid mode, the storage inverter 130 may transition to voltage source mode while PV inverter 140 continues to operate in current source and remains synchronized to the voltage source inverter 130. In this case the PV inverter 140 may be unaware that disconnect 160 is open, i.e. there is no connection to the external grid 150. In this exemplary embodiment, the logic of control system 200 may be housed in controller 230 of inverter 130. In another embodiment, the logic may be implemented by a master controller external to any power converter.

Upon obtaining the last known grid voltage, frequency, and phase angle, power system 100 may implement different methods to synchronize the plurality of power converters. For example, in an embodiment, the power system may implement a droop control method when transitioning the plurality of power converters to microgrid mode and synchronizing the plurality of inverters. In the droop control method, the control system comprises a plurality of individual power controllers each controlling a power converter. Each of the individual controllers may implement the droop control method on its power converter. Droop control changes the output frequency of the power converter based on load active power and output voltage amplitude based on load reactive power. In implementing the droop control method, the individual controllers of the power converters do not necessarily have to have direct communication between each other. If the individual controller of the power converter recognizes excess load on itself, the controller reduces the power converter frequency and facilitates sharing the load between the power converters even through there is not necessarily direct communication between the power converters.

Figure 3:
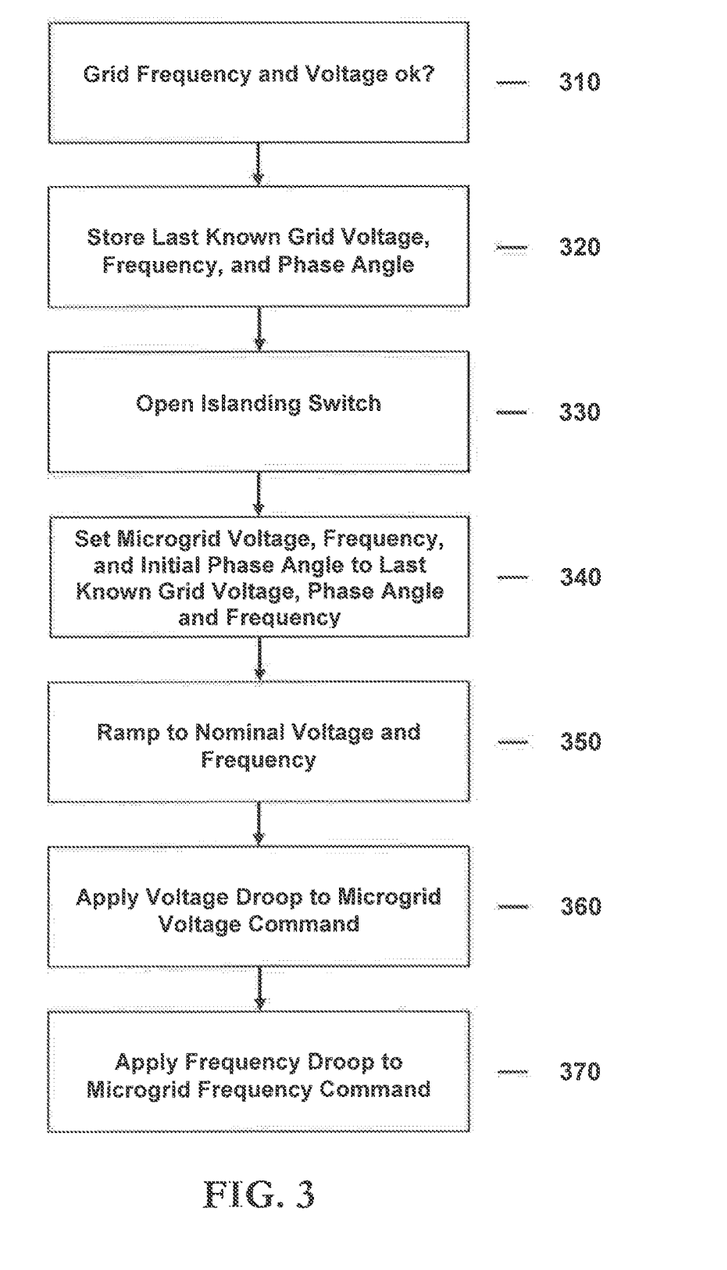
FIG. 3 illustrates a method in which a droop method is implemented to synchronize a plurality of power converters.

FIG. 3 illustrates a method in which power system 100 implements a droop method to synchronize a plurality of power converters. The power converters receive power commands from control system 200. While the power system 100 is running in grid-tied mode, control system 200 regularly checks the grid frequency and grid voltage and determines whether these values are acceptable (step 310). If the grid frequency and grid voltage are not acceptable, control system 200 stores the grid voltage, frequency, and phase angle at the time power system 200 determines that the grid voltage and/or frequency are out of bounds (step 320) and opens the islanding switch (step 330). Steps 340-370 are performed by each of the individual power converter controllers. First, the microgrid voltage and frequency are set to the last known grid voltage, frequency, and phase angle (at step 340). Next, the output voltage amplitude and frequency of each power converter is ramped by its corresponding power converter controller from the last known voltage amplitude and frequency to the nominal voltage amplitude and frequency (step 350). Next, each power converter controller applies a voltage droop to the microgrid voltage command, which facilitates the sharing of reactive power (step 360). Finally, each power converter controller applies a frequency droop to the microgrid frequency command which facilitates the sharing of active power among the power converters.

The following control logic illustrates an embodiment in which the control system includes a plurality of controllers each controlling one power converter. The plurality of power converters each implement a droop control method. In the below embodiment, each of the power converters transitions from a current control mode to a voltage control mode when the power system transitions from grid-tied to microgrid mode. Each of the power converters may operate independently when transitioning from grid-tied mode to microgrid mode and synchronizing the power converters. Thus, the below control logic is implemented on each of the power converters of the power system.

```
while(state=runPQ and grid_ok=1)
    controlP(Pcmd_usr);
    controlQ(Qcmd_usr);
    check_grid(grid_ok);
    if (grid_ok != 1)
        state = transition_uf;
        last_volt = grid_volt;
        last_freq = grid_freq;
        last_ph = grid_ph;
    else if
        state = runPQ;
    endif
endwhile
```

In the above control logic, the power system is running in grid-tied mode prior to transitioning to microgrid mode. while(state=runPQ and grid_ok=1) is where the power converters of the power system are running in grid-tied mode and the grid conditions are within bounds. In this case, the power converters may receive active power (P) and reactive power (Q) commands Pcmd_usr and Qcmd_usr from a site master controller (user). 'controlP(Pcmd_usr)' and 'controlQ(Qcmd_usr)' are routines to control the active and reactive power of the power converter to be the power command. check_grid(grid_ok) is a routine to check the external grid. This routine monitors the grid voltage amplitude and frequency. if (grid_ok !=1) refers to the situation in which grid conditions are abnormal. state=transition_uf initiates transition to microgrid mode. last_volt=grid_volt, last_freq=grid_freq, and last_ph=grid_ph store the last known grid voltage, frequency, and phase angle, which may be a grid voltage or frequency that is out of bounds and is considered abnormal. state=runPQ continues to run the power system in grid-tied mode when the grid is normal.

The following control logic illustrates the transition of the power system from grid-tied mode to microgrid mode. Similar to the above control logic, this control logic is implemented by each of the power converters.

```
while(state=transition_uf)
    open_Kext( );
    wait(Kext_open_tm);
    Pha = Pha + freq*dt;
    ramp(U_set, last_volt, volt_nom, ramprate_U)
    ramp(F_set, last_freq, freq_nom, ramprate_F)
    U_set = U_nom - KQV * Qout;
    F_set = F_nom - KPF * Pout;
    controlU(U_set);
    controlF(F_set);
    if (U_set=U_nom and F_set=F_nom and Kext=open)
        state = runUF;
```

```
        elseif
            state = transitionUF;
        endif
    endwhile
```

During the transition state (i.e., transition_uf), the output voltage amplitude and the frequency of the power converter is ramped from the last known voltage amplitude and frequency (which may be a voltage or frequency that is out of bounds and considered abnormal) to the nominal voltage amplitude and frequency. The nominal (or normal) voltage and frequency may, for example, be 480V, 60 Hz. open_Kext( ) commands the islanding switch to open. wait(Kext_open_tm) is a command to wait for the amount of time that it takes the islanding switch to open. In some embodiments, this wait may not be applied, in which the time is 0. Pha=PHA+freq*dt is a routine that conducts the phase calculation. dt is the loop time for the calculations. When transitioning to microgrid mode, the phase for microgrid mode is initialized with the phase from the last known grid phase angle. ramp(U_set, last_volt, volt_nom, ramprate_U) and ramp(F_set, last_freq, freq_nom, ramprate_F) ramp the microgrid voltage and frequency commands/setpoints from the last known grid voltage and frequency to the nominal voltage and frequency. This initialization is performed to minimize transients and to have a smooth transition to microgrid mode. In the ramp routines, the output is U_set and F_set. The inputs are the initial conditions of the last grid voltage and frequency and the ramp rate to be applied. U_set=U_nom−KQV*Qout applies a voltage droop to the voltage command to facilitate sharing of reactive power. U_nom is the nominal voltage. KQV (V/kVAR) is the droop slope. The droop slope may be set to minimize the voltage excursion while, at the same time, having high speed sharing between the power converters. For example, a value of Kdrp=20% RatedKVA/Volt may cause a drop of 1V when a power converter is outputting 20% of its rated reactive output. For a 480V system this may be acceptable. If the system is set to a lower voltage than 480V, this value may be reduced. Qout is the measured output reactive power and is measured by each power converter using for example, internal voltage and current sensors. controlU(U_set) is a routine to control the microgrid voltage to the voltage command/setpoint, and controlF(F_set) is a routine to control the microgrid frequency to the frequency command/setpoint. if (U_set=U_nom and F_set=F_nom and Kext=open) checks if ramping of voltage and frequency is finished and if the islanding switch is open, and if so the transition is finished and microgrid mode is running (state=runUF). Otherwise the power system remaining in the transition state (state_transition UF).

The following control logic illustrates the power systems operation in microgrid mode (state=runUF). Similar to the above control logic, this control logic is implemented by each of the power converters.

```
    while(state=runUF)
        U_set = U_nom - KQV * Qout;
        F_set = F_nom - KPF * Pout;
        if (storage_SOC > SOC_highlimit)
            curtail_generation( );
        elseif
            unconstrained_generation( );
        endif
        controlU(U_set);
        controlF(F_set);
    endwhile
```

In the above control logic, each of the power converters continues to apply the frequency and voltage droop. In addition, when the power converter is coupled to a battery power resource, its controller may monitor the charge of the battery power resource to determine whether renewable generation should be curtailed. U_set=U_nom−KQV*Qout and F_set=F_nom−KPF*Pout are the voltage and frequency droop, which are continued to be applied to the voltage and frequency commands/set points in microgrid mode. if (storage_SOC>SOC_highlimit) checks whether battery storage is getting overcharged. curtail_generation( ) curtails generation of the renewable power resource, which may be accomplished by, for example, by turning off the generation, commanding the renewable resource to produce less, increasing the microgrid frequency to signal the resource to produce less, or tripping the renewable resource offline by changing the microgrid frequency beyond the nominal frequency. unconstrained_generation( ) allows the renewable resource to generate power unconstrained. controlU(U_set) and controlF(F_set) are routines to control the microgrid voltage and microgrid frequency to the voltage and frequency setpoints/commands.

In another embodiment, a master/slave configuration may be implemented on the plurality of power converters. In a master/slave configuration, one of the power converters can act as a microgrid master which attempts to control the output voltage amplitude and frequency. Alternatively, the site controller may act as a master controller. In this case, the power converters may all be slave devices.

The master power converter or master controller commands the slave power converters to output a certain level of active and reactive currents by sending active and reactive current commands to the slave power converters. The amplitude of these current references may be calculated in a closed-loop fashion based on microgrid voltage control. That is, one master inverter may control the voltage, and the other slave inverters may receive a command from the master inverter regarding the current they should supply into the microgrid so that the load can be shared between multiple inverters.

Once in microgrid mode, fast communication signals may be required between the master and slave devices to make sure that all of the devices are aligned and operating at the same frequency as the frequency of the microgrid, for example, at 60 Hz. These signals may include the current references and synchronization signals. The synchronization signals may be, for example, electrical or fiber optic carried pulses that are sent at regular intervals. In another embodiment, the synchronization signals may be time based synchronization signals based on a standard protocol such as IEEE 1588.

In an embodiment in which the power system comprises a plurality of energy storage inverters, the master controller or master power converter may issue real and reactive current commands to the slave power inverters based on the remaining energy available in the individual storage devices. For example, the master controller may issue a current command that is greater in value to a slave storage inverter coupled to a storage device with more energy, while also issuing a current command that is less in value to a slave storage inverter coupled to a storage device with less energy.

When the power system includes an energy storage system comprising a battery and a power converter and a renewable energy storage system, surplus renewable energy may exist. This surplus energy may be used to charge the battery. In this case, there is the possibility of overcharging storage devices and creating an unstable situation on the microgrid. To counter this, the master controller device may send power curtail commands to renewable generation sources, send shutdown commands to generation sources or adjust the microgrid frequency to trip the generation sources offline. When the storage devices are sufficiently depleted to be able to accept charge again, the renewable devices may be brought back online by restoring the microgrid frequency to nominal values and allowing the generation devices to reconnect to the microgrid.

Figure 4:
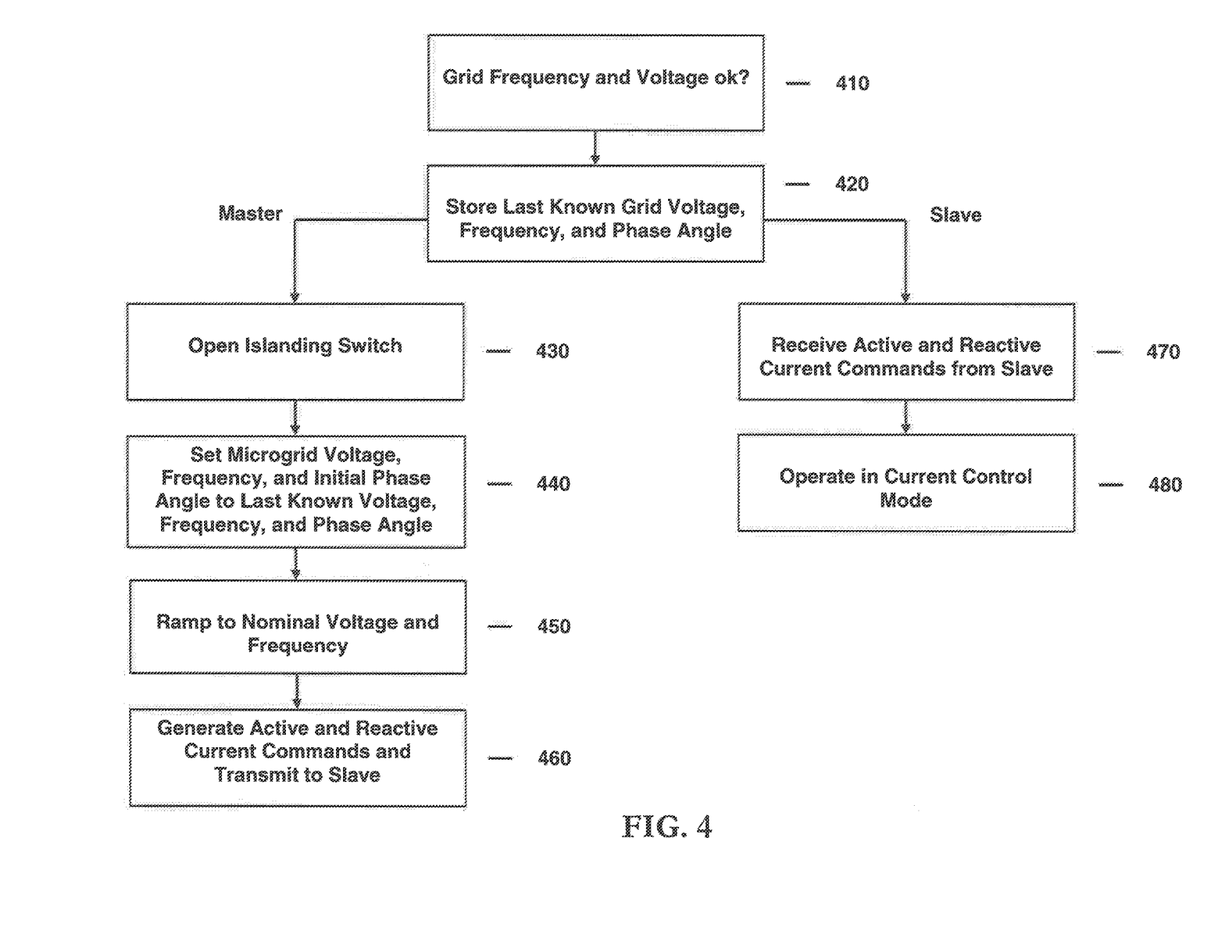
FIG. 4 illustrates a method in which a master/slave configuration is implemented to synchronize a plurality of power converters.

FIG. 4 illustrates a method in which a master/slave configuration is implemented. Control system 200 checks the grid voltage and grid frequency (step 410). If the grid voltage and/or the grid frequency are out of bounds, the control system 200 stores the grid voltage and frequency at the time power system 200 determines that the grid voltage and/or frequency are out of bounds (step 420). The master controller and each of the plurality of slave controllers then perform a series of steps. The master controller opens the islanding switch (step 430). Next, the master controller sets the microgrid voltage, initial phase angle, and frequency to the last known grid voltage and frequency (i.e., the stored grid voltage, frequency, and phase angle) (step 440). The master controller ramps the microgrid voltage and frequency commands from the last known grid voltage and frequency to the nominal grid voltage and frequency (step 450). The master controller generates active and reactive power commands and transmits these commands to the slave power converters (step 460). The slave power converters receive the active and reactive power commands and operate in current control mode according to the received commands (step 480).

The following control logic illustrates an embodiment in which a master-slave setup is implemented. The control system includes a master controller operating in voltage control mode and one or more slave controllers operating in current control mode. The master controller may be one of the individual controllers that controls its respective power converter, in which case the power converter may be referred to as a master power converter. In another embodiment, the master controller may be a site-wide controller that coordinates the distributed energy resources of the overall system. The slave controllers each may an individual controller that controls its' respective slave power converter. The master controller controls the transition to microgrid mode and commands the slave power converters to follow the current command.

```
while(state=runPQ and grid_ok=1)
    controlP(Pcmd_usr);
    controlQ(Qcmd_usr);
    check_grid(grid_ok);
    if (grid_ok != 1 and is_master)
        state = transition_uf;
        last_volt = grid_volt;
        last_freq = grid_freq;
        last_ph = grid_ph;
        command_slave(transition_uf);
    else if
        state = runPQ;
    endif
endwhile
```

In the above control logic, the power system is running in grid-tied mode (PQ) prior to transitioning to microgrid mode (UF). while(state=runPQ and grid_ok=1) is where the power converters of the power system are running in grid-tied mode and the grid conditions are within bounds. In this case, the power converters may receive active power (P) and reactive power (Q) commands Pcmd_usr and Qcmd_usr from a site master controller (user). These may also be referred to as the setpoints of the power converter. 'controlP (Pcmd_usr)' and 'controlQ(Qcmd_usr)' are routines to control the active and reactive power of the power converter to be the power command. check_grid(grid_ok) is a routine to check the external grid. This routine monitors the grid voltage amplitude and frequency. if (grid_ok !=1 and is_master) applies to the master controller and refers to the situation in which grid conditions are abnormal. state=transition_uf initiates transition to microgrid mode. last_volt=grid_volt and last_freq=grid_freq store the last known grid voltage and frequency, which may be a grid voltage or frequency that is out of bounds and is considered abnormal. state=runPQ continues to run the power system in grid-tied mode when the grid is normal.

The following control logic illustrates an embodiment of the transition of the power system from grid-tied mode to microgrid mode when the controller is the master controller. As noted above, the below control logic may be implemented by the controller of a master inverter, or alternatively, may be implemented by the site master controller.

```
while(state=transition_uf)
    open_Kext( );
    wait(Kext_open_tm);
    Pha = Pha + freq*dt;
    ramp(U_set, last_volt, volt_nom, ramprate_U)
    ramp(F_set, last_freq, freq_nom, ramprate_F)
    U_set = U_nom - KQV * Qout;
    F_set = F_nom - KPF * Pout;
    controlU(U_set);
    controlF(F_set);
    if (U_set=U_nom and F_set=F_nom and Kext=open)
        state = runUF;
    elseif
        state = transitionUF;
    endif
endwhile
```

During the transition state (i.e., transition_uf), the microgrid voltage amplitude and frequency are ramped from the last known voltage amplitude and frequency (which may be a voltage or frequency that is out of bounds and considered abnormal) to the nominal voltage amplitude and frequency by the master controller. The nominal (or normal) voltage and frequency may, for example, be 480V, 60 Hz. open_Kext( ) commands the islanding switch to open. wait(Kext_open_tm) is a command to wait for the amount of time that it takes the islanding switch to open. In some embodiments, this wait may not be applied, in which the time is 0. Pha=PHA+freq*dt is a routine that conducts the phase calculation. dt is the loop time for the calculations. When transitioning to microgrid mode, the phase for microgrid mode is initialized with the phase from the last known grid phase angle. ramp(U_set, last_volt, volt_nom, ramprate_U) and ramp(F_set, last_freq, freq_nom, ramprate_F) ramp the microgrid voltage and frequency commands/setpoints from the last known grid voltage and frequency to the nominal voltage and frequency. This initialization is performed to minimize transients and to have a smooth transition to microgrid mode. In the ramp routines, the output is U_set and F_set. The inputs are the initial conditions of the last grid voltage and frequency and the ramp rate to be applied. controlU(U_set, F_set, Id_cmd, Iq_cmd) is a routine to control the microgrid voltage to the microgrid voltage command/setpoint and the microgrid frequency to the microgrid frequency command/setpoint. In addition to controlling the microgrid voltage and frequency, the master controller generates active and reactive current commands (IId_cmd and Iq_cmd) for the slave controllers operating in current control mode to follow. if (U_set=U_nom and F_set=F_nom and Kext=open) checks if ramping of voltage and frequency is finished and if the islanding switch is open, and if so the transition is finished and microgrid mode is running (state=runUF). Otherwise the power system remains in the transition state (state_transition UF).

The following control logic illustrates the transition of the power system from grid-tied mode to microgrid mode when the controller is a slave controller.

```
while(state=transition_uf and is_slave)
    control_current(Id_cmd, Iq_cmd);
endwhile
``` control_current(Id_cmd, Iq_cmd) is the slave power converter's routine when transitioning to microgrid mode. The slave power converter is operating in current control mode, and the slave controller of the slave power converter receives the real and reactive current commands Id_cmd, Iq_cmd from the master controller.

The following control logic illustrates an embodiment of the power systems operation in microgrid mode (state=runUF) when the controller is a master controller.

```
while(state=runUF and is_master)
    controlU(U_set, F_set, Id_cmd, Iq_cmd);
    if (storage_SOC > SOC_highlimit)
        curtail_generation( );
    elseif
        unconstrained_generation( );
    endif
endwhile
```

In the above control logic, the master controller continues the routine to control the microgrid voltage to the microgrid voltage command/setpoint and the microgrid frequency to the microgrid frequency command/setpoint. In addition to controlling the microgrid voltage and frequency, the master controller generates active and reactive current commands (IId_cmd and Iq_cmd) for the slave controllers operating in current control mode to follow. if (storage_SOC>SOC_highlimit) checks whether battery storage is getting overcharged. curtail_generation( ) curtails generation of the renewable power resource. unconstrained_generation( ) allows the renewable resource to generate power unconstrained.

The following control logic illustrates an embodiment of the power systems operation in microgrid mode (state=runUF) when the controller is a slave controller controlling one of the power converters.

```
while(state=runUF and is_slave)
    control_current(Id_cmd, Iq_cmd);
endwhile
```

In the above control logic, the slave controller continues to operate in current control mode, and the slave controller of the slave power converter receives the real and reactive current commands Id_cmd, Iq_cmd from the master controller to control the output current to the real and reactive current commands Id_cmd, Iq_cmd.

Figure 5:
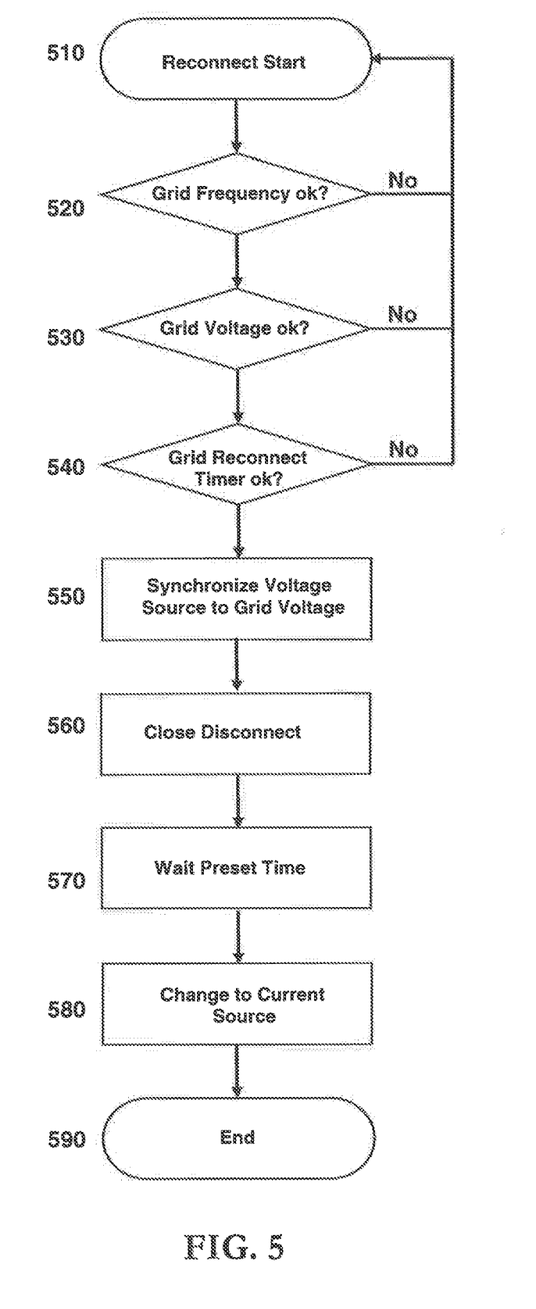
FIG. 5 illustrates a method of controlling the power system according to an embodiment of the present invention in which the power system transitions from microgrid mode to grid-tied mode.

FIG. 5 illustrates a method of controlling the power system according to an embodiment of the present invention in which the power system transitions from microgrid mode to grid-tied mode. Generally, while operating in microgrid mode, control system 200 may continuously check the voltage and frequency of the grid side of disconnect 160 and determine if the measured voltage and frequency are within the boundaries defined. These boundaries may be defined, for example, by regulatory compliance requirements for inverters.

Control system 200 may be configured to check the voltage and frequency periodically by using a countdown timer. In some implementations, once acceptable voltage and frequency are measured, a preset amount time may need to pass prior to reconnecting to the grid to help ensure that the voltage and frequency are stable.

Referring to FIG. 5 in more detail, the control system 200 may perform an analysis to determine whether it is safe to transition to grid-tied mode (step 510). The analysis may include determining whether the grid frequency is within bounds (step 520), whether the grid voltage (step 530) is within bounds and whether the grid reconnect timer has expired (step 540). If any of steps 520, 530, or 540 fail, the process restarts at step 510. Otherwise, when the grid frequency and voltage are within bounds and the reconnect timer expires, the voltage source is synchronized to the grid voltage at step 550.

The synchronization of the voltage source to the grid voltage may comprise adjusting the frequency of the microgrid gradually, to align the phase of the microgrid with the grid voltage and lock in to the grid voltage. For example, in an embodiment, there is a voltage source on both sides of disconnect 160, one voltage source may be the grid while the other voltage source is the microgrid. Once control system 200 determines that the synchronization has occurred, disconnect 160 may be closed (step 560) because the voltages on either side of disconnect 160 are the same or nearly the same. Thus, any large transience is avoided as disconnect 160 is closed. After a preset period of time (step 570), the power converters will transition to current source mode and the operation will resume to grid-tied mode. The preset time period may be based on the amount of time it will take for the disconnect 160 to close once control system 200 issues a close command.

Instead of having voltage sensors B going back to the control system 200, a commercially available synchronizing relay may be used. The relay may send a signal to the control system once the phase of the microgrid is matched to the phase of the utility grid. Based upon this signal the control system 200 could close disconnect 160.

The above described embodiments are described as a microgrid connected to a utility grid as the external grid. However, it should be understood that the external grid is not limited to a utility grid. For example, the microgrid could be further segmented into multiple microgrids. Each of the microgrids would have an energy source (renewable, generators, storage) and a load. The microgrids could then re-connect and disconnect from/to each other as needed.

The disclosed embodiments provide power systems and methods in which a plurality of power converters connected in parallel seamlessly transition from grid-tied mode to microgrid mode. In embodiments of the present invention, by way of inter-unit synchronization and/or control signal communication, upon detection of abnormal grid voltage and/or frequency conditions, a plurality of power converters may seamlessly transition to islanded mode, form a microgrid and continue powering the critical island load.

It will be apparent to those skilled in the art that various modifications and variations can be made to the disclosed power system without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

The invention claimed is:

1. A power system comprising:
a plurality of power converters coupled together at a point of common coupling (PCC), wherein the power converters are configured to be coupled to a load at the PCC and the power converters are configured to provide a combined power converter output to the load;
a switch coupled to the PCC, wherein the switch is configured to be coupled in series between the PCC and an external grid such that when the switch is closed the power system is in a grid-tied configuration and such that when the switch is open the power system is in an microgrid configuration;
a control system comprising one or more controllers coupled to the plurality of power converters, the control system being configured to:
enable the switch to open and close in response to a signal received from one or more sensors for monitoring the external grid;
enable the power converters to operate in a current control mode when the switch is closed and when the power system is in the grid-tied configuration
transition the plurality of power converters from grid-tied mode to microgrid mode and synchronize the power converters such that the power converters share the load by, for each converter, applying voltage droop to a voltage setpoint based on a nominal voltage amplitude, a droop voltage slope, and a measured output reactive power, and by, for each converter, applying frequency droop to a frequency setpoint based on a nominal frequency, a droop frequency slope, and a measured output active power.

2. The power system of claim 1, wherein the PCC is a shared AC bus.

3. The power system of claim 1, further comprising:
a proximate sensor coupled between the PCC and the switch; and
a distal sensor coupled between the switch and the external grid,
wherein the control system enables the switch to open and close in response to signals received from the proximate sensor and the distal sensor.

4. The power system of claim 3, wherein:
the control system is configured to receive a distal sensor signal to measure an external grid input, and
the control system is configured to enable the switch to open when the control system determines that the external grid input is in an abnormal state.

5. The power system of claim 4, wherein
the control system is configured to receive a proximate sensor signal to measure a combined power converter output, and
the control system is configured to enable the switch to close when the control system determines that the external grid input is in a normal state and when the combined power converter output substantially matches the external grid input.

6. The power system of claim 5, wherein
the control system is configured to, after enabling the switch to close, synchronize each of the power converters to the external grid voltage, wherein in synchronizing each of the power converters to the grid the control system changes the frequency of each of the power converters together so that the power converters remain synchronous with each other.

7. The power system of claim 5, wherein
the external grid is in the abnormal state when at least one of a voltage amplitude or frequency is outside of lower or upper bounds.

8. The power system of claim 1, wherein the control system being configured to transition the plurality of power converters from grid-tied mode to microgrid mode and synchronize the power converters such that the power converters share the load includes the control system being configured to:
transition one or more of the plurality of power converters from the current control mode to a voltage control mode in which the one or more of the plurality of power converters establishes the voltage of the microgrid.

9. The power system of claim 1, wherein the control system being configured to transition the plurality of power converters from grid-tied mode to microgrid mode and synchronize the power converters such that the power converters share the load includes the control system being configured to:
record the grid phase angle prior to transitioning to microgrid mode; and
set the initial microgrid phase angle according to the recorded grid phase angle.

10. The power system of claim 1, wherein:
the control system being configured to transition the plurality of power converters from grid-tied mode to microgrid mode and synchronize the power converters such that the power converters share the load includes the control system being configured to implement droop control on each of the plurality of power converters.

11. The power system of claim 10, wherein the control system being configured to implement droop control on each of the plurality of power converters includes the control system being configured to, for each power converter, apply the voltage droop to the voltage setpoint and the frequency droop to the frequency setpoint in accordance to $$U\_set = U\_non KQV * Qou$$

wherein $U_{13}$ set corresponds to a voltage setpoint amplitude,
$U_{13}$ non corresponds to the nominal voltage amplitude,
KQV corresponds to the droop voltage slope (V/kVAR), and
Qou corresponds to the measured output reactive power, and $$F\_set = F\_non KPF * Pou$$

wherein $F_{13}$ set corresponds to a frequency setpoint of the CI output, $F_{13}$ non corresponds to the nominal frequency, KPF corresponds to the droop frequency slope (Hz/kW), and Pout corresponds to the measured ouput active power.

12. The power system of claim 10, wherein the control system comprises a plurality of controllers each controlling one of the power converters, and each of the controllers implements the droop control on the one of the power converters.

13. The power system of claim 1, wherein:

the control system comprises a plurality of controllers each controlling one of the plurality of power converters, wherein one of the plurality of controllers is a master controller and the remaining one or more controllers are slave controllers, and the control system being configured to transition the plurality of power converters from grid-tied mode to microgrid mode and synchronize the power converters such that the power converters share the load includes:

the master controller being configured to:
enable its power converter to operate in voltage control mode by controlling the microgrid voltage amplitude and frequency; and
generate active and reactive current command for the slave controllers to follow; and the one or more slave controller being configured to:
receive the active and reactive current commands from the master controller; and
enable their power converters to operate in current control mode.

14. The power system of claim 1, further comprising a plurality of power resources coupled to the inverters.

15. The power system of claim 14, wherein the power resources are selected from the group consisting of battery power resources, photovoltaic power resources, fuel cell power resources, compressed air storage power resources, capacitor power resources, wind turbine power resources, microturbine power resources, hydro power resources, wave power resources, thermal power resources, flywheel power resources, and biomass power resources.

16. The power system of claim 14, wherein the plurality of resources include a battery power resource and a renewable power resource, and the control system is further configured to:

after transitioning the plurality of power converters from grid-tied mode to microgrid mode, compare a battery storage of the battery power resource to a highlimit threshold of the battery power resource, and if the battery storage exceeds the highlimit threshold, command the renewable power resource to curtail power generation.

17. The power system of claim 14, further comprising one or more DC/DC converters each serially coupled between one of the power resources and one of the power converters.

18. The power system of claim 1, wherein the switch is one of a contactor, a motorized switch, and a semiconductor AC switch.

19. The power system of claim 1, wherein when in an islanding microgrid configuration the power converters equally contribute to the combined output to the load.

20. The power system of claim 1, wherein when in an islanding microgrid configuration the power converters do not equally contribute to the combined output to the load.

21. A power system comprising:

a plurality of power converters coupled together at a point of common coupling (PCC), wherein the power converters are configured to be coupled to a load at the PCC and the power converters are configured to provide a combined power converter output to the load;

a switch coupled to the PCC, wherein the switch is configured to be coupled in series between the PCC and an external grid such that when the switch is closed the power system is in a grid-tied configuration and such that when the switch is open the power system is in an microgrid configuration;

a control system comprising one or more controllers coupled to the plurality of power converters, the control system being configured to:
enable the switch to open and close in response to a signal received from one or more sensors for monitoring the external grid;
enable the power converters to operate in a current control mode when the switch is closed and when the power system is in the grid-tied configuration;
transition the plurality of power converters from grid-tied mode to microgrid mode and synchronize the power converters such that the power converters share the load, wherein:

the control system comprises a plurality of slave controllers each controlling one of the plurality of power converters and a master controller coordinating the plurality of slave controllers, and the control system being configured to transition the plurality of power converters from grid-tied mode to microgrid mode and synchronize the power converters such that the power converters share the load includes:

the master controller being configured to:
operate in voltage control mode by controlling the microgrid voltage amplitude and frequency; and
generate active and reactive current commands for the slave controllers to follow; and the one or more slave controller being configured to:
receive the active and reactive current commands from the master controller; and
enable their power converters to operate in current control mode during which the output current of a power converter coupled to a slave controller of the one or more slave controllers is controlled using the active and reactive current commands from the master controller.

22. A method of transitioning a plurality of power converters that are coupled together at a point of common coupling (PCC) from a grid-tied mode to a microgrid mode using a master controller and one or more slave controllers coupled to the power converters, the method comprising:

opening an islanding switch coupled in series between the PCC and the external grid;

setting, by the master controller, the microgrid voltage and frequency commands to the last known grid voltage and grid frequency;

ramping, by the master controller, the microgrid voltage and frequency commands from the last known grid voltage and grid frequency to a nominal voltage and a nominal frequency;

generating, by the master controller, active and reactive current commands for the one or more slave controllers to follow;

operating the one or more slave controllers in current control mode during which the output current of a power converter coupled to a slave controller of the one or more slave controllers is controlled using the active and reactive current commands from the master controller.

23. The method of claim 22, further comprising:
setting, by the master controller, the microgrid initial phase angle according to the last known grid phase angle.

24. The method of claim 22, further comprising:
monitoring an external grid voltage amplitude and frequency to determine whether the external grid voltage amplitude and frequency fall outside of upper or lower bounds and the islanding switch should be opened.

25. The method of claim 22, wherein the power converters are coupled to a battery power resource and a renewable power resource, the method further comprising:
comparing, by the master controller, a battery storage of the battery power resource to a highlimit threshold of the battery power resource, and if the battery storage exceeds the highlimit threshold commanding the renewable power resource to curtail power.

* * * * *